March 4, 1947. R. H. CURTIS 2,416,680
APPARATUS FOR MAKING ACCRETED FIBROUS PRODUCTS
Filed Aug. 14, 1943 3 Sheets-Sheet 1
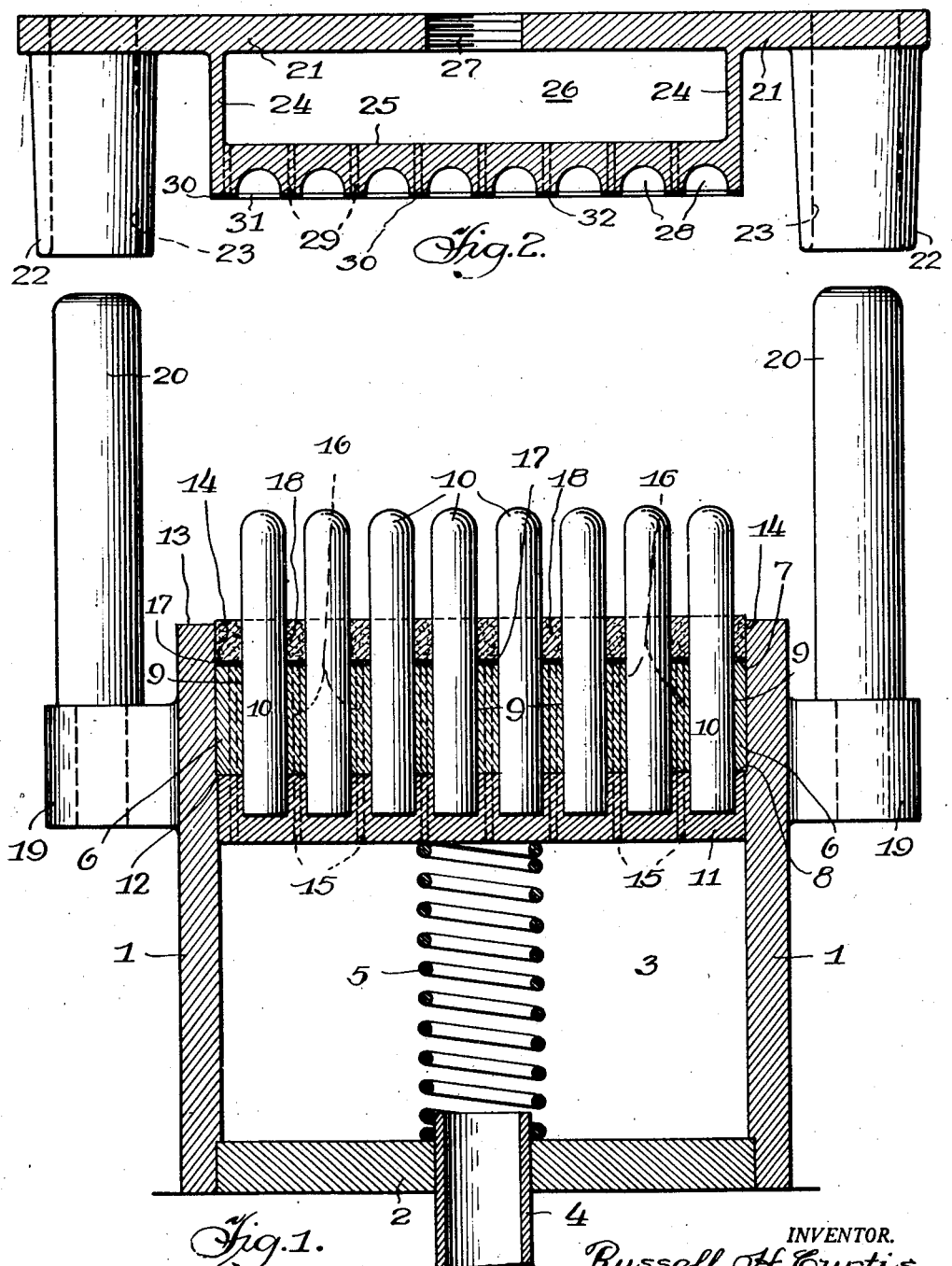
INVENTOR.
Russell H. Curtis,
BY
Parkinson & Lane
Attys March 4, 1947.  R. H. CURTIS  2,416,680
APPARATUS FOR MAKING ACCRETED FIBROUS PRODUCTS
Filed Aug. 14, 1943  3 Sheets-Sheet 2
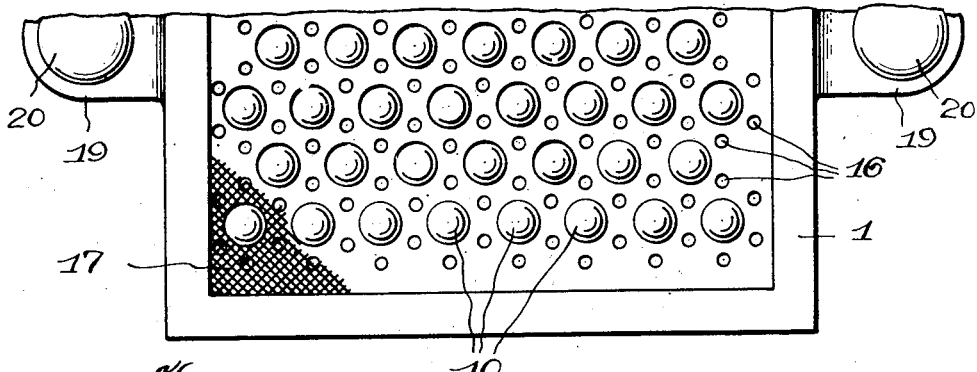
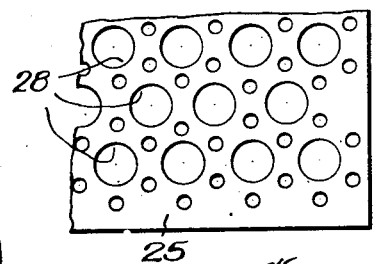
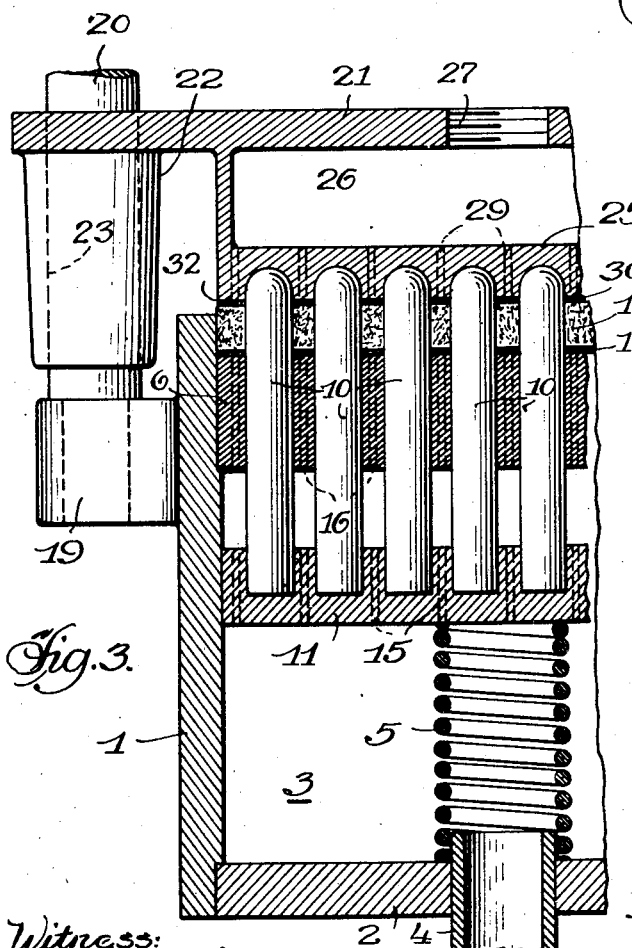
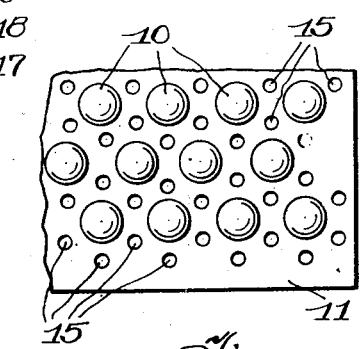
INVENTOR.
Russell H. Curtis.
By Parkinson & Lane
Attys.

March 4, 1947.  R. H. CURTIS  2,416,680
APPARATUS FOR MAKING ACCRETED FIBROUS PRODUCTS
Filed Aug. 14, 1943  3 Sheets-Sheet 3
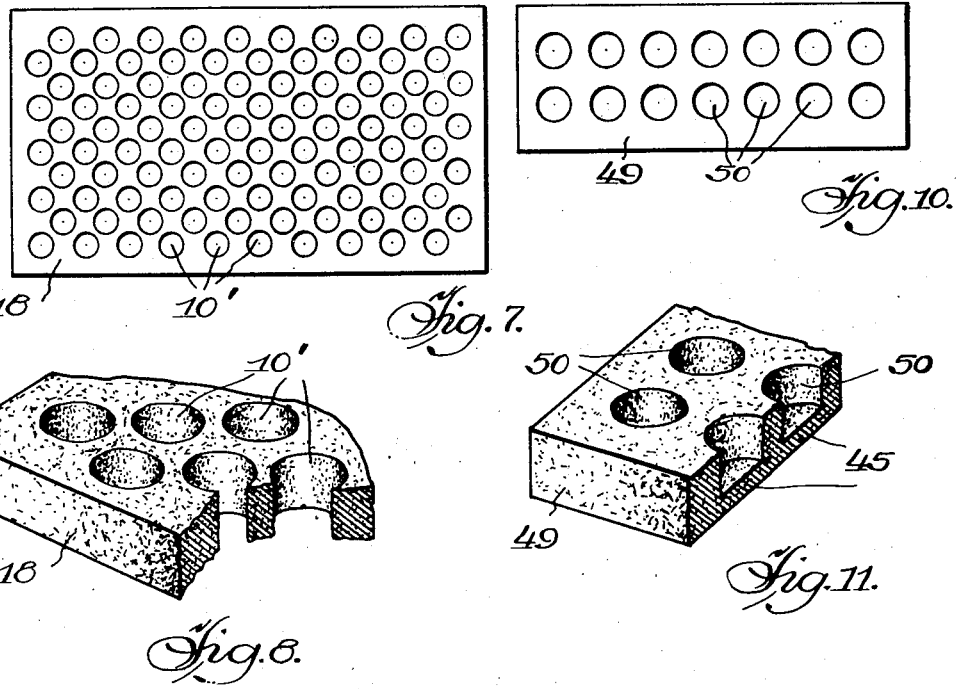
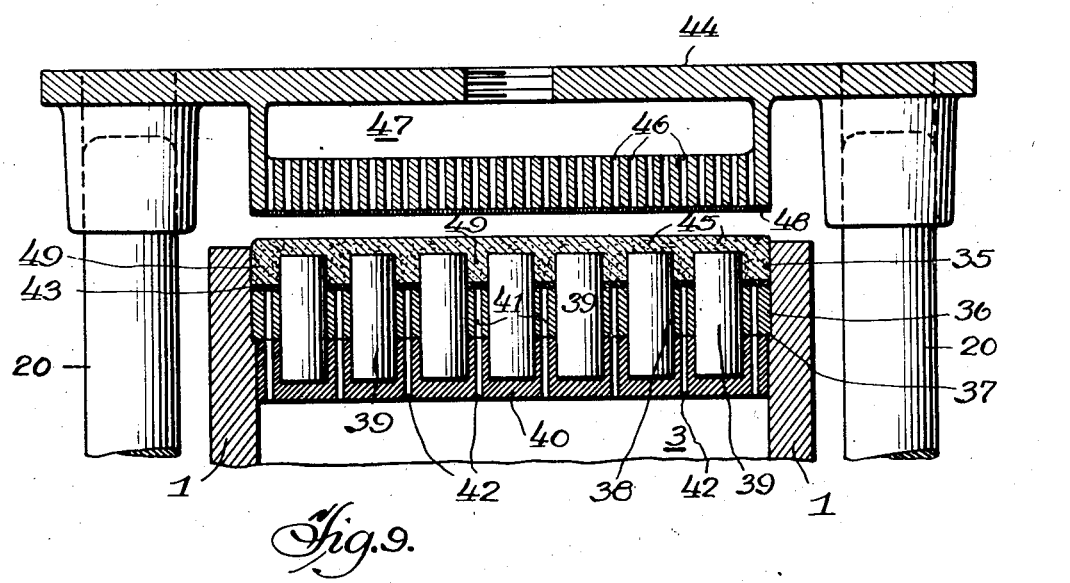
INVENTOR.
Russell H. Curtis,
BY Parkinson & Lane
Attys
Witness:
Chas. L. Koursh Patented Mar. 4, 1947

2,416,680

UNITED STATES PATENT OFFICE 2,416,680

APPARATUS FOR MAKING ACCRETED FIBROUS PRODUCTS

Russell H. Curtis, St. Charles, Ill., assignor, by mesne assignments, to Hawley Products Company, a corporation of Delaware Application August 14, 1943, Serial No. 498,687

8 Claims. (Cl. 92—54)

This invention relates to a method and apparatus for making detailed, accreted, or felted fibrous articles in which fine edge and other details can be distinctly and sharply made, and to articles made thereby.

Prior to my invention it has been impossible to satisfactorily produce accreted fibrous articles in which sharp and distinct edges or other sharp, clear cut delineations were required, regardless of whether such construction comprised a body having a number of holes extending either entirely or part way through the body, or a body having a depression or depressions, or one or more raised portions therein or thereon, or otherwise required sharp and clearly defined, definite, clear cut delineations thereon of any desired configuration.

This is due partly to the fact that heretofore it has been impossible to obtain a sufficiently uniform and positive distribution of the fibers into and around sharp corners or other similar delineations to produce the desired, and much sought for, clear cut and sharp detailed felting.

Among the objects of my invention are to make possible a novel method and apparatus in which the above objections and short comings have been overcome, and in which I am able to produce accreted fibrous articles having the advantages referred to.

A further object of my invention is to make possible the production of sharp and clear cut felted details in accreted fibrous articles regardless of whether the delineations are holes extending entirely or part way through the accreted body, or whether they may be other shapes extending into or projecting outwardly from the body. This includes both cameo and intaglio designs, and regardless of whether the accreted body is flat or contoured.

Another object is to provide novel apparatus in which can be secured a positive and uniform distribution of the fibers during felting, such as to enable the detail felting referred to.

A still further object is to make possible the production of accreted or felted articles having openings, depressions or other configurations, the edges of which must be very precise, in order to safely pack articles which with careless handling might explode, break, or suffer other damage during transportation, such as primers, detonators, small shells, glass tubes, and other delicate, breakable or damageable articles.

Other objects, advantages and capabilities will later more fully appear.

My invention further resides in the combination, construction and arrangement of parts illustrated in the accompanying drawings, and while I have shown therein preferred embodiments, I wish it understood that the same are susceptible of modification and change without departing from the spirit of my invention.

In the drawings:

Fig. 1 is a vertical longitudinal section through one form of accreting or felting former embodying my invention, parts being shown in elevation for the sake of clearness.

Fig. 2 is a vertical longitudinal section through a transfer device for removing the wet felted or accreted carcass from the former of Fig. 1, parts being shown in elevation for clearness.

Fig. 3 is a fragmentary vertical section through the felting former of Fig. 1 and the transfer device of Fig. 2, showing the latter in position on the former and slightly above its final closing position thereon.

Fig. 4 is a fragmentary top plan view looking down upon the top of the felting former of Fig. 1, and showing the pins, drainage holes and a small portion only (for convenience) of the metallic screen having small openings to prevent fibers from entering the larger drainage holes.

Fig. 5 is a fragmentary bottom plan view looking up towards the bottom face of the portion of the transfer device which contacts the carcass, but with the perforated screening plate removed.

Fig. 6 is a fragmentary top plan view of a portion of the upper face of the pin block with the upstanding pins fixed therein.

Fig. 7 is a plan view on a reduced scale, of the finished accreted, fibrous article formed in the apparatus shown in Figs. 1–3, and having a large number of holes with sharp, detailed edges.

Fig. 8 is a fragmentary perspective view of a portion of the article of Fig. 7, and shown on a larger scale.

Fig. 9 is a vertical longitudinal section of a modified form of felting former and transfer device embodying my invention, parts being shown in elevation for clearness.

Fig. 10 is a plan view, on a reduced scale, of the finished accreted, fibrous article formed in the apparatus shown in Fig. 9 in which the holes extend only part way through the carcass.

Fig. 11 is a fragmentary perspective view of a portion of the article of Fig. 10, and shown on a larger scale.

Referring more in detail to the drawings one form of my novel apparatus for accreting or felting fibers is shown in Fig. 1, which device is a felting former having longitudinally movable pins around which the carcass is accreted or felted in any well known pulp bath (not shown), there being provided means, described more fully hereinafter, for moving the pins inwardly through the wet carcass and removing the accreted carcass from the pins so as to form sharp, clear cut, well defined and detailed edges around the openings formed by the pins. Fibrous plates or other shaped articles thus formed, and after being dried, are sufficiently rigid to hold their shape for the purposes intended, and yet be soft enough to prevent damage to, or caused by, the contents of the containers in which these fibrous articles are packed. In the holes, depressions, projections, or other shapes of the fibrous plates, or the like, any of many kinds of delicate articles may be packed for transportation, such as primers, detonators, small military shells, glass tubes, and other articles that require careful handling.

As seen in Fig. 1, the felting former comprises a hollow body portion having side walls 1, and a bottom 2, joined together to enclose a chamber 3 within which a suction may be effected from any suitable source, through the pipe 4, which as shown, extends upwardly a slight distance above the bottom to form a seat around which is seated the bottom coils of a coiled spring 5. The transverse cross section of the walls 1 and chamber 3 may be rectangular, circular or any other desired shape to suit the shape of the fibrous plates or other articles to be made.

Fixed to the inner surfaces of the side walls 1, any desired distance below the upper ends thereof, and extending transversely across the chamber 3, is a perforated plate 6, having a top face 7 and a bottom face 8. Extending vertically through this plate 6 are any desired number of large openings 9 in which are slidably mounted pins 10 fixedly mounted in a pin block 11 of an overall size such as to permit it to be freely movable vertically in chamber 3 and yet close enough to the inner faces of the walls 1 to enable the maintenance of a suction in the chamber.

A shoulder 12 is formed around the inner face of walls 1, against which the lower edges of the perforated plate 6 rests to further insure rigidity of this plate with relation to the walls of the felting former. Pin block 11 is normally held upwardly against the lower face 8 of plate 6 by coil spring 5, but movable downwardly away therefrom when sufficient downward pressure is exerted against this spring by downward pressure upon the upper ends of pins 10 as later explained, and which pins extend a substantial distance above the top edge 13 of the felting former. The top face 7 of plate 6 is such distance below the edge 13 to provide a depression or recess 14 of a depth substantially equal to the thickness of the fibrous plate or article to be accreted or felted therein. The pins 10 may be of any desired shape in cross section, such as circular, rectangular, or any other shape desired in accordance with the requirements of the things to be packed therein.

The pin block 11, will be formed around each pin with a substantial number of vertically extending holes 15, as seen in Figs. 1 and 6, which may be greater or less in number and size, as desired, to meet the required purpose of suction, these holes extending entirely through the pin block. The plate 6, which as stated has openings which slidably receive pins 10, is likewise formed around the large holes 9 with vertical suction holes 16 corresponding in size, position and number to the holes 15 in the pin block, so that these two series of holes will respectively be in alinement to enable suction to be exerted from chamber 3 upwardly to the entire top face 7 of plate 6.

Fixed to the top face 7 is a screen 17 of mesh of desired smallness to serve as a drainage means to holes 16 and 15 and also afford sufficient suction to effectively and firmly accrete or felt the fibers, in a pulp bath, around the pins 10 to more than fill the depression or pan 14, to a depth to enable a desired amount of compression of the fibrous carcass 18 when the transfer device is forced downwardly there against (see Figs. 1 and 3). In the views of the drawing just referred to the transfer device has not yet moved downwardly for a desired compressing action. Normally the carcass 18 will be compressed sufficiently to bring its upper surface shown in Figs. 1 and 3, down to the level of the top edge 13 of walls 1, or lower if desired. However any other degree compression desired may be used, it being kept in mind that too much compression that would unduly harden the article, is not desired, as it is preferred that for use in handling explosives, or breakable things, that a reasonable amount of softness is desired for cushioning purposes. In those types of things that do not readily break, or become damaged, a greater degree of compression may be used, and if desired resinous material may be added to the fibers to increase their strength.

Extending laterally outwardly from walls 1, on two opposite sides of the felting former box, are lugs 19 (one on each side). Fixed to each of lugs 19, or integral as desired, to extend upwardly at a suitable distance away from walls 1, is a leader pin 20, this pair of leader pins acting to guide the transfer device to place as later described.

The construction of the transfer device will be understood from Figs. 2 and 3. It comprises a top plate 21 having on two of its opposite edges, downwardly extending sleeves or tubular ears 22 each formed with a vertical opening 23 of a size to just nicely and freely slide over the leader pins 20 to guide the transfer device to the upper surface of the carcass 18. Depending from plate 21, either integral or bolted thereto as desired, are side walls 24 having integral or fixed thereto the bottom wall 25, these walls, together with top plate 21, forming a chamber 26 which may have suction or pressure applied thereto from any suitable source through a pipe (not shown) screwed into the threaded opening 27.

Formed in the lower face of bottom wall 25, and positioned to coincide with the upper ends of pins 10, are a number of recesses 28 having semi-spherical shaped bottoms to correspond with the semi-spherical shape of the upper ends of these pins. Suitably spaced around the exteriors of each of recesses 28 are a number of vertical openings 29, sufficient in number to create a suction from chamber 26 to the fibrous carcass to cause the carcass to adhere to the transfer device and be lifted thereby when desired. Also at some later step the suction can be cut off from chamber 26 and air or other pressure applied thereto to blow the carcass off from the transfer device if desired.

Secured to the lower face of bottom wall 25 of the transfer device is a perforated plate 30, preferably of brass, and formed with openings 31 of the same diameter as the large part of the recesses 28, and of the same number and registering therewith. Plate 30 is also formed with a large number of minute holes 32 extending vertically therethrough to have connection with chamber 26 through holes 29 to enable suction or air pressure therethrough as referred to above.

When the carcass 18 has been accreted (in a a pulp bath) in the hollow bed 14 of the felting former around the pins 10, and the felting former removed from the pulp bath (of which any type desired may be used), the transfer device is lowered to pass the holes 23 of tubular ears 22, over the leader pins 20, and cause the upper ends of the pins 10 to enter the recesses 28. Continued downward movement will push pins 10 and pin block 11 downwardly against the compression of coil spring 5 to such extent that the lower face of plate 30 will contact the upper face of wet carcass 18. Further downward movement will compress the wet carcass the desired amount, the limit of which may be controlled by stops, or by the lower ends of ears 22 striking lugs 19, as desired.

It is important to note that during the downward movement of the transfer device, the pins 10 are moved downwardly through the carcass and stripped therefrom. This produces sharp edges around the holes, and when the transfer device is lifted the leader pins and ears 22 guide this upward movement in a straight path with relation to the felting form and removes the carcass from the pins 10, suction being maintained in the chamber 26, holes 29 and small holes 32 to cause the carcass to adhere to the transfer device. Stopping this suction will release the carcass, which removal may be further accelerated by introducing air under pressure into chamber 26 if desired.

In Fig. 4, which is a fragmentary view looking down upon the felting former of Fig. 1, only a portion of the metal screen 17 is shown for convenience, it being understood that this screen will extend throughout the extent of the upper face of the plate 6, except for the pins 10. If desired a metal plate having minute holes therethrough (like the plate 30 of the transfer device) may be used in the place of the screen 17, the purpose being to permit drainage while accreting, without letting the fibers pass into the larger drainage openings.

In Fig. 3 the transfer device is shown as having just made contact with the upper face of the carcass, with the pins 10 and their pin block 11 pushed downwardly against coil spring 5. If desired to compress the carcass, the transfer device may be pushed farther downwardly to the desired amount.

In Fig. 7 is shown a plan veiw of a fibrous plate of desired thickness, the holes 10' having been formed by the pins 10 of Fig. 1. As will be understood there can be any number desired of such holes, and the thickness of the plate can be controlled as desired. Such plates may be used for the transportation of detonators, primers and other articles requiring careful handling, for military and other uses. The articles to be packed will be inserted one in each hole till the plate is full, and others similarly packed, stacked thereon, with paper or other protecting means between each two plates if desired.

Fig. 8 shows a fragment of such plate in perspective to better illustrate the sharpness and clear cut outlines around the edges of the holes.

In Fig. 9 I have shown a modification of my invention in which the pins do not extend entirely through the fiber plate. In the form shown in Fig. 9, the same kind of walls 1, suction chamber 3, and leader pins 20, as in Fig. 1 are used. The bottom of the accreting chamber or bed 25 may be made of a single plate with upstanding pins, or it may be formed with a depression or depressions of any desired shape so as to form upstanding projections on the fiber plate. In other words many variations, falling within the spirit of my invention, may be availed of.

In the form shown in Fig. 9 the bottom of the accreting chamber 35 comprises a plate 36 fixed to the walls 1 to rest on the shoulder 37 and having large openings 38 to receive any desired number of upstanding pins 39 which at their bottom ends are fixed in the plate or block 40 which in turn may be either immovably fixed to walls 1, or be vertically slidable therein as desired. If plate or block 40 is slidable with relation to walls 1, a coil spring such as shown in Fig. 1, or any other well known mechanism for normally holding it up but permitting it, with its pins 39, to be lowered, may be used as desired.

Plate 36 is provided around pins 39 with a large number of vertical drainage holes 41 similar to holes 16 in Fig. 1. Also the plate or block 40 is around pins 39 provided with a similar number of holes 42 similar to holes 15 in Fig. 1 and respectively in alinement with holes 41 and for a similar purpose. Above plate 36 against its upper face is a drainage screen 43 for a purpose similar to that of screen 17 of Fig. 1.

The transfer device 44 in Fig. 9 is similar to that of Fig. 2 except that it does not have the recesses 28 because they are not needed as pins 39 in Fig. 9 are shorter and stop short of the top surface of the carcass to provide a top web 45 as seen in Figs. 9 and 11. In the transfer device of Fig. 9, drainage holes 46 are provided to communicate with the suction or pressure chamber 47, there also being provided in Fig. 9 on the lower face of the transfer device, a brass or other metal plate 48, having a large number of minute holes similar in general to plate 30 in Fig. 2 except for the absence of the large holes 31 for pins 10.

When the transfer device of Fig. 9 is lowered upon the upper face of the carcass 49 pressure may be applied to the carcass to compress it the desired amount, and suction applied to the chamber 47 to cause the carcass to adhere to the transfer device and lift the carcass from its accreting former, and transfer it to any desired plate for drying. When the block 40 is fixed to the walls 1 and the pins 39 are immovable the carcass will be raised upwardly away from these pins by the transfer device. When the pins and block 40 are arranged to be lowered, the pins may first be lowered away from the carcass which will then be lifted by the transfer device.

In both the forms of Figs. 1 and 9, the wet carcass when removed from the felting or accreting former by the transfer device, may be dried in any desired manner, as by a drying die, or placed in an infra-red or other type of drying oven.

Fig. 10 shows a carcass that has been formed in the apparatus of Fig. 9, and in Fig. 11 I have shown in enlarged fragmentary perspective view a portion of the carcass of Figs. 9 and 10, to better illustrate how it is not necessary for the holes to extend entirely through the carcass, and how sharp, clear cut edges result even though made by accreting fibers onto a felting former. In Figs. 10 and 11 the holes formed in the carcass by pins 39 are indicated at 50.

As will be understood, the felting former may be lowered in a fiber-water bath of any desired type, such for example as that shown in Sloan Patent 2,222,003 of November 19, 1940, and the carcass 18 or 49, accreted while the felting former is in the bath, after which the felting former will be raised out of the bath for the further treatments described herein.

Having described my invention, I claim:

1. In apparatus for forming accreted fibrous products having a large number of relatively closely spaced apertures, a foraminous felting former having a fixed perforated plate and side walls providing a felting depression, a spring-pressed perforated member disposed below the plate and carrying a plurality of upstanding pins aligned with the perforations in the plate with the pins being of such length as to extend through and above the plate and felting depression to form well defined apertures in the fibrous product being accreted, a suction chamber below and communicating through the perforations of both the plate and member providing drainage from the depression, a foraminous transfer device adapted to be lowered to engage and depress the pins and member and engage the article, means for aligning the transfer device with the former and pins, and suction means associated with the transfer device whereby the latter picks up the article and removes it from the depression.

2. In apparatus for forming accreted fibrous articles having a large number of apertures therein, comprising a foraminous felting former adapted to be positioned in a fiber-liquid bath and having side walls, a bottom wall, and a two-part partition wall comprising a perforated plate fixed to the side walls and a perforated movable plate disposed therebelow having upstanding fixed pins movable through the perforations in the fixed plate, the walls forming a suction chamber and a felting depression above the fixed plate with the pins extending into and through the depression, communicating openings in the perforated plates for conducting suction from the chamber to the depression, yielding means for normally holding the movable plate against the fixed plate except when the pins are forced downwardly, and a foraminous transfer device movable downwardly against the ends of the pins to force them downwardly and thereafter compressing the accreted article, said device being provided with means for picking up the compressed accreted article and lifting it out of the depression.

3. In apparatus for forming accreted fibrous articles having a plurality of relatively closely spaced apertures therein, comprising a foraminous felting former adapted to be introduced into a fiber-liquid bath and comprising side walls and a two-part partition comprising an apertured plate fixed to the side walls and providing the base of the depression and a perforated movably mounted plate having a plurality of relatively closely spaced pins aligned with and slidable through the apertures in the fixed plate and through the depression, means for normally holding the movable plate yieldably against the fixed plate, and means for depressing the pins and movable plate to force the pins inwardly through the apertures and separate the plates, the movable plate returning to its position against the fixed plate when the force against the pins is released.

4. In apparatus for forming accreted fibrous articles, a foraminous felting former having side walls, a bottom wall, and a two-part partition wall having an apertured plate fixed to the side walls and a spring-pressed perforated movable plate therebelow having fixed upstanding pins movable through the apertures in the fixed plate, said walls forming a suction chamber and the side walls with the fixed plate forming a felting depression, the pins being of such length as to extend into and through the depression, and means for conducting suction from the chamber to the depression, the perforated movable plate being normally held against the fixed plate except when the pins are forced downwardly to strip the article therefrom.

5. In apparatus for forming accreted fibrous articles, comprising a foraminous felting former adapted to be introduced into a fiber-liquid bath and having side walls and an apertured wall fixed with relation to the side walls to form an accreting depression, pins movably mounted in the apertures of the fixed wall and extending into the depression, a foraminous transfer device adapted to be lowered to first engage and depress the pins in the apertures and then engage and compress the formed article, the transfer device having means for picking up the accreted article and removing it from the depression.

6. In apparatus for forming accreted fibrous articles having a plurality of spaced apertures throughout the body of the articles, a foraminous felting former having an accreting depression, a spring-pressed perforated member disposed below the accreting depression and provided with upstanding pins normally projecting through and above the depression for forming the spaced apertures in the articles, a chamber disposed below said member and communicating passages opening into the depression and from said perforated member into the chamber for drainage, a foraminous transfer device vertically movable with respect to the former, aligning means on the former and transfer device, and means for moving the transfer device for first engaging and depressing these pins and member and then engaging the article being formed, said transfer device having means for removing the formed article from the depression.

7. In apparatus for forming accreted fibrous articles having a plurality of relatively closely spaced apertures, comprising a foraminous felting former having upstanding side walls, a perforated bottom wall fixed to the side walls to form an accreting depression, a perforated wall disposed below said fixed wall and provided with a plurality of relatively closely spaced, upstanding pins aligned with and extending through the perforations in the bottom wall and into the accreting depression, suction means for accreting a fiber carcass in the depression and about the upstanding pins, and a foraminous transfer device adapted to be vertically lowered into contact with the formed carcass for compressing the same and provided with means for picking up the compressed carcass and removing it from the depression.

8. In apparatus for forming accreted fibrous articles having a plurality of apertures throughout its body, a foraminous felting former having an accreting depression and a perforated vertically movable member therebelow having a plurality of upstanding aperture-forming pins extending into and through the depression whereby a fibrous carcass will fill the depression and surround the pins, and a foraminous transfer device adapted to be lowered to first engage and depress the pins and member and then engage and compress the carcass, said transfer device having means for picking up the carcass and moving it out of the felting former depression.

RUSSELL H. CURTIS.

REFERENCES CITED

The following references are of record in the file of this patent:

UNITED STATES PATENTS

| Number | Name | Date |
|---|---|---|
| 2,341,499 | Cunningham | Feb. 8, 1944 |
| 2,247,355 | Brown | July 1, 1941 |
| 513,017 | Howard | Jan. 16, 1894 |
| 1,918,782 | Randall | July 18, 1933 |
| 2,310,998 | Sawyer | Feb. 16, 1943 |
| 1,175,001 | Mangelsdorf | Mar. 14, 1916 |
| 1,699,704 | Ledeboer | Jan. 22, 1929 |
| 1,415,649 | Jagenburg | May 9, 1922 |
| 2,026,765 | Woodford | Jan. 7, 1936 |
| 1,586,076 | Dickey | May 25, 1926 |
| 2,310,830 | Blair et al. | Feb. 9, 1943 |

FOREIGN PATENTS

| Number | Country | Date |
|---|---|---|
| 23,421 | Austria | Sept. 15, 1905 |
| 352,379 | British | July 9, 1931 |
| 568,162 | French | Dec. 18, 1923 |
| 23,421 | German | Jan. 1, 1883 |
| 55,747 | Norwegian | Oct. 7, 1935 |